(12) United States Patent
Adams et al.

(10) Patent No.: US 8,875,489 B2
(45) Date of Patent: Nov. 4, 2014

(54) REDUCTION OF PARTICULATE, NOX, AND AMMONIA EMISSIONS

(75) Inventors: Karen Marie Adams, Ann Arbor, MI (US); Yisun Cheng, Ann Arbor, MI (US); Giovanni Cavataio, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/540,401

(22) Filed: Jul. 2, 2012

(65) Prior Publication Data

US 2012/0269706 A1 Oct. 25, 2012

Related U.S. Application Data

(63) Continuation of application No. 12/755,987, filed on Apr. 7, 2010, now Pat. No. 8,209,955.

(51) Int. Cl.

| | |
|---|---|
| *F01N 3/00* | (2006.01) |
| *F01N 3/10* | (2006.01) |
| *F01N 3/02* | (2006.01) |
| *F02D 41/02* | (2006.01) |
| *F02D 41/14* | (2006.01) |
| *F01N 3/08* | (2006.01) |
| *F02D 41/00* | (2006.01) |
| *F01N 13/00* | (2010.01) |
| *F01N 3/035* | (2006.01) |
| *F02D 41/38* | (2006.01) |
| *F01N 3/20* | (2006.01) |

(52) U.S. Cl.
CPC ............... *F01N 3/0842* (2013.01); *F01N 3/035* (2013.01); *F02D 41/029* (2013.01); *F02D 41/1463* (2013.01); *Y02T 10/42* (2013.01); *F02D 41/1446* (2013.01); *F02D 41/38* (2013.01); *F02D 2041/1468* (2013.01); *F02D 41/1454* (2013.01); *Y02T 10/24* (2013.01); *F02D 41/0002* (2013.01); *F02D 41/1448* (2013.01); *F02D 41/0052* (2013.01); *F02D 41/0275* (2013.01); *F01N 3/2066* (2013.01); *F01N 13/009* (2014.06)
USPC .................. 60/285; 60/274; 60/295; 60/297; 60/301; 60/311

(58) Field of Classification Search
USPC ............ 60/274, 276, 285, 295, 297, 301, 311
See application file for complete search history.

(56) References Cited

U.S. PATENT DOCUMENTS

| | | | |
|---|---|---|---|
| 5,771,685 A | 6/1998 | Hepburn | |
| 6,732,507 B1 | 5/2004 | Stanglmaier et al. | |

(Continued)

FOREIGN PATENT DOCUMENTS

CN 101018597 A 8/2007

OTHER PUBLICATIONS

Nakatani, Koichiro, et al., "Simultaneous PM and Nox Reduction System for Diesel Engines" SAE Technical Paper Series 2002-01-0957, Detroit, Michigan, Mar. 2002, 10 Pgs.

(Continued)

*Primary Examiner* — Binh Q Tran
*Assistant Examiner* — Diem Tran
(74) *Attorney, Agent, or Firm* — Julia Voutyras; Alleman Hall McCoy Russell & Tuttle LLP (57) ABSTRACT

A method for controlling emissions from an engine includes reducing trapped nitrogen oxides to ammonia on an LNT catalyst while concurrently oxidizing soot accumulated on the LNT catalyst, and, flowing the ammonia so formed to an SCR catalyst.

12 Claims, 5 Drawing Sheets

(56) References Cited

U.S. PATENT DOCUMENTS

| | | |
|---|---|---|
| 6,813,884 B2 | 11/2004 | Shigapov et al. |
| 6,823,660 B2 | 11/2004 | Minami |
| 7,231,761 B2 | 6/2007 | Okugawa et al. |
| 7,332,135 B2 | 2/2008 | Gandhi et al. |
| 7,485,273 B2 | 2/2009 | Gandhi et al. |
| 2001/0032459 A1 | 10/2001 | Hirota et al. |
| 2003/0216254 A1 | 11/2003 | Takeshima et al. |
| 2004/0076565 A1 | 4/2004 | Gandhi et al. |
| 2004/0096383 A1 | 5/2004 | Montreuil et al. |
| 2007/0125072 A1 | 6/2007 | McCarthy, Jr. et al. |
| 2009/0165442 A1 | 7/2009 | Hara |

OTHER PUBLICATIONS

Partial Translation of Office Action of Chinese Application No. 201110075818.6, Issued Jun. 30, 2014, State Intellectual Property Office of PRC, 13 Pages.

REDUCTION OF PARTICULATE, NOX, AND AMMONIA EMISSIONS

CROSS REFERENCE TO RELATED APPLICATIONS

The present application is a continuation of U.S. patent application Ser. No. 12/755,987 filed Apr. 7, 2010 now U.S. Pat. No. 8,209,955, the entire contents of which are incorporated herein by reference for all purposes.

TECHNICAL FIELD

This application relates to the field of motor-vehicle engineering, and more particularly, to emissions control in diesel and lean-burn gasoline engine systems.

BACKGROUND AND SUMMARY

Various technologies are useful for controlling emissions from motor-vehicle engine systems. A regenerable soot filter such as a diesel particulate filter (DPF) may be used to trap and oxidize soot. A lean nitrogen-oxide trap (LNT) may be used to trap and periodically reduce nitrogen oxides (NOx). A selective catalytic reduction (SCR) catalyst may be used to destroy NOx by reacting it with a nitrogenous reducing agent. Further, some of these technologies can be combined for added benefit.

In one example, U.S. Pat. No. 7,485,273 to Gandhi et al. describes an exhaust aftertreatment system for a motor vehicle, in which an SCR catalyst is coupled downstream of an LNT. In this configuration, the SCR catalyst traps ammonia that is released by the LNT during rich conditions. During subsequent lean conditions, NOx that fails to be reduced in the LNT is reduced by the trapped ammonia.

In another example, U.S. Patent Application Publication 2001/0032459 describes a soot filter in which an LNT catalyst is applied to a DPF substrate (a DPF/LNT). Unlike other soot filters, which must be regenerated by periodic exposure to high-temperature exhaust, the DPF/LNT is capable of continuous regeneration at temperatures greater than 250° C. It is believed that 'active oxygen' evolved in the catalyst by storage of NOx accelerates oxidation of the entrapped soot.

The inventors herein have recognized various synergies that can be achieve when coupling an SCR catalyst downstream of a DPF/LNT. In one embodiment, a method for controlling emissions from an engine is provided. The method comprises reducing trapped nitrogen oxides to ammonia on an LNT catalyst while concurrently oxidizing soot accumulated on the LNT catalyst. The method further comprises flowing the ammonia so formed to an SCR catalyst. In this manner NOx emissions are controlled more effectively than would be possible with an LNT alone. Moreover, soot is removed as well as NOx, and under some operating conditions, continuous, fuel-efficient regeneration of soot-trapping capacity is possible while still providing ammonia to the SCR. In one embodiment, reducing the trapped NOx includes flowing exhaust from the engine over the LNT catalyst. Here, at least one of an air-to-fuel ratio of the exhaust and a duration of said flowing may be adjusted in response to an amount of soot accumulated on the LNT catalyst. In this way, it is possible to provide the appropriate amount of reductant to the LNT, taking into account the soot collected thereon, which may also serve as a reductant for NOX.

It will be understood that the summary above is provided to introduce in simplified form a selection of concepts that are further described in the detailed description, which follows. It is not meant to identify key or essential features of the claimed subject matter, the scope of which is defined by the claims that follow the detailed description. Further, the claimed subject matter is not limited to implementations that solve any disadvantages noted herein.

DETAILED DESCRIPTION

The subject matter of this disclosure is now described by way of example and with reference to certain illustrated embodiments. Components, process steps, and other elements that may be substantially the same in one or more embodiments are identified coordinately and are described with minimal repetition. It will be noted, however, that elements identified coordinately may also differ to some degree. It will be further noted that the drawing figures included in this disclosure are schematic and generally not drawn to scale. Rather, the various drawing scales, aspect ratios, and numbers of components shown in the figures may be purposely distorted to make selected features or relationships easier to see.

Figure 1:
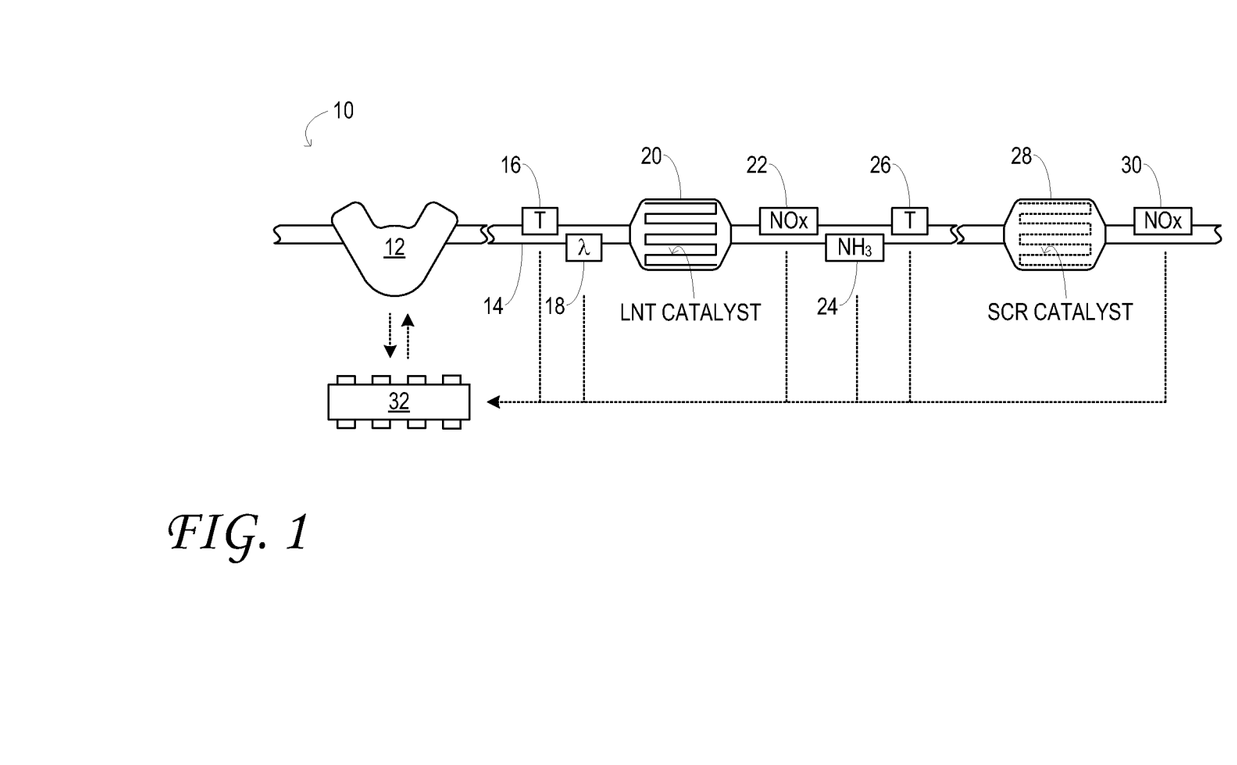
FIG. 1 schematically shows aspects of an example engine system in accordance with an embodiment of this disclosure.

FIG. 1 schematically shows aspects of an example engine system 10 in one embodiment. The engine system includes engine 12, which admits air and fuel and releases exhaust. In one embodiment, air may be admitted to the engine via one or more throttle valves coupled directly or indirectly to an intake air cleaner. In this and other embodiments, the air may be admitted to the engine via a turbocharger and/or supercharger compressor. In engine 12, combustion may be initiated via spark ignition and/or compression ignition in any variant. Further, the engine may be supplied any of a variety of fuels: gasoline, alcohols, diesel, biodiesel, compressed natural gas, etc. Fuel may be supplied to the combustion chambers via direct injection, port injection, throttle-body injection, or any combination thereof.

Continuing in FIG. 1, exhaust released from engine 12 is conducted through exhaust conduit 14, in which various sensors and exhaust-aftertreatment stages are arranged. The nature, number, and arrangement of the sensors and exhaust-aftertreatment stages may differ in the different embodiments of this disclosure. In general, the exhaust-aftertreatment stages may include a plurality of exhaust-aftertreatment catalysts configured to catalytically treat the exhaust flow, and thereby reduce an amount of one or more substances in the exhaust flow.

In the illustrated embodiment, first temperature sensor 16 and air-fuel ratio sensor 18 are arranged in exhaust conduit 14. Coupled in the exhaust conduit downstream of the first temperature and air-fuel ratio sensors is DPF/LNT stage 20. The DPF/LNT stage comprises a soot filter (e.g., DPF) substrate supporting an LNT-type catalyst wash coat; the wash coat may be arranged on an internal cell structure of the soot filter substrate. As such, the DPF/LNT stage may be configured to trap NOx from the exhaust flow when the exhaust flow is lean, and to reduce the trapped NOX when the exhaust flow is rich. In the various embodiments of this disclosure, the LNT wash coat may be formulated to optimize the relative amount of NOx reduced to ammonia (as opposed to $N_2$ and $N_2O$, for example) in the exhaust flowing over it. In one embodiment, the LNT wash coat may comprise alkali metals (e.g., cesium), alkaline-earth metals (e.g., barium), and/or rare-earth metals (e.g., cerium). In these and other embodiments, the LNT wash coat may comprise a composite of cerium and zirconium. The LNT wash coat may also comprise one or more precious metals such as platinum, palladium, rhodium, ruthenium, and iridium. The formulation of the LNT wash coat with respect to the distributions and environments of such metals may be adjusted to enhance the water gas shift reaction (WGS, viz., $CO+H_2O \rightarrow CO_2+H_2$) to promote the formation of $H_2$. Thus, the $H_2$ so formed may react with gas phase NOx and stored NOx over the LNT wash coat to increase the yield of ammonia. In one particular example, higher platinum levels and ceria levels can be incorporated in the LNT formulation to enhance the process.

DPF/LNT stage 20 is also configured to trap and oxidize soot particles in the exhaust flow. Oxidation of trapped soot particles in the DPF/LNT stage may be enacted periodically. Under at least some conditions, however, trapped soot particles may be oxidized continuously on the LNT catalyst of the DPF/LNT stage and at relatively low exhaust temperatures of 250° C. or higher. In one embodiment, soot may collect on the same internal surfaces of the DPF/LNT stage that support the LNT catalyst. By inference, 'active oxygen' evolved in the LNT catalyst of the DPF/LNT stage under certain operating conditions may facilitate the relatively low-temperature oxidation of the trapped soot.

Arranged in exhaust conduit 14 downstream of DPF/LNT stage 20 are first NOx sensor 22, ammonia sensor 24, and second temperature sensor 26. Coupled in the exhaust conduit downstream of the first NOx sensor, ammonia sensor, and second temperature sensor is SCR stage 28. The SCR stage may be any device configured to selectively reduce NOx using ammonia supplied in the exhaust flow. In one embodiment, the SCR stage, like the DPF/LNT stage, may comprise a soot filter (e.g., DPF) substrate; on an internal cell structure of the soot filter substrate, an SCR-type catalyst wash coat may be arranged. Continuing in FIG. 1, second NOx sensor 30 is arranged in the exhaust conduit downstream of the SCR stage.

FIG. 1 shows electronic control system 32 operatively coupled to engine 12. The electronic control system may be any electronic control system of the vehicle in which engine system 10 is installed. The electronic control system may be configured to control one or more throttle valves and/or fuel injectors of the engine and thereby control the air-fuel ratio of the exhaust released by the engine. In addition, the electronic control system may be configured to govern an injection timing, spark timing, intake valve timing and/or exhaust valve timing of the engine. In this manner, the electronic control system may exert control over the temperature of the exhaust released by the engine. To assess operating conditions in connection with the control functions contemplated herein, the electronic control system may be operatively coupled to various sensors arranged throughout the engine system—flow sensors, temperature sensors, pedal-position sensors, pressure sensors, etc. In particular, electronic control system 32 is operatively coupled to first and second temperature sensors 16 and 26, first and second NOx sensors 22 and 30, air-fuel ratio sensor 18 and ammonia sensor 24.

Engine system 10 offers numerous advantages for reducing NOx and particulate emissions from a vehicle. For instance, the sensors coupled upstream and downstream of the SCR stage enable improved monitoring of NOx conversion therein as well as closed-loop control of the amount of ammonia provided thereto. The system offers a further advantage over a basic LNT plus SCR system, in that soot is removed also, and in a more fuel-efficient manner than would be possible by appending a separate soot filter, owing to the active-oxygen evolving character of the LNT catalyst in DPF/LNT stage 20.

It will be understood that no aspect of FIG. 1 is intended to be limiting. For instance, other embodiments fully consistent with this disclosure may include additional exhaust-aftertreatment stages coupled in exhaust conduit 14. One such stage may comprise an exhaust-aftertreatment catalyst configured to oxidize residual hydrocarbons and/or carbon monoxide in the exhaust flow. Further, some embodiments may lack one or more of the sensors identified above and may still enable at least some of the functionality identified herein.

Still other embodiments may provide a different distribution of catalysts in the exhaust-aftertreatment stages of the engine system. For example, the catalysts may be arranged in zoned and/or layered configurations, and in mixed configurations where a single exhaust aftertreatment stage provides DPF, LNT, and SCR functionality.

Figure 2:
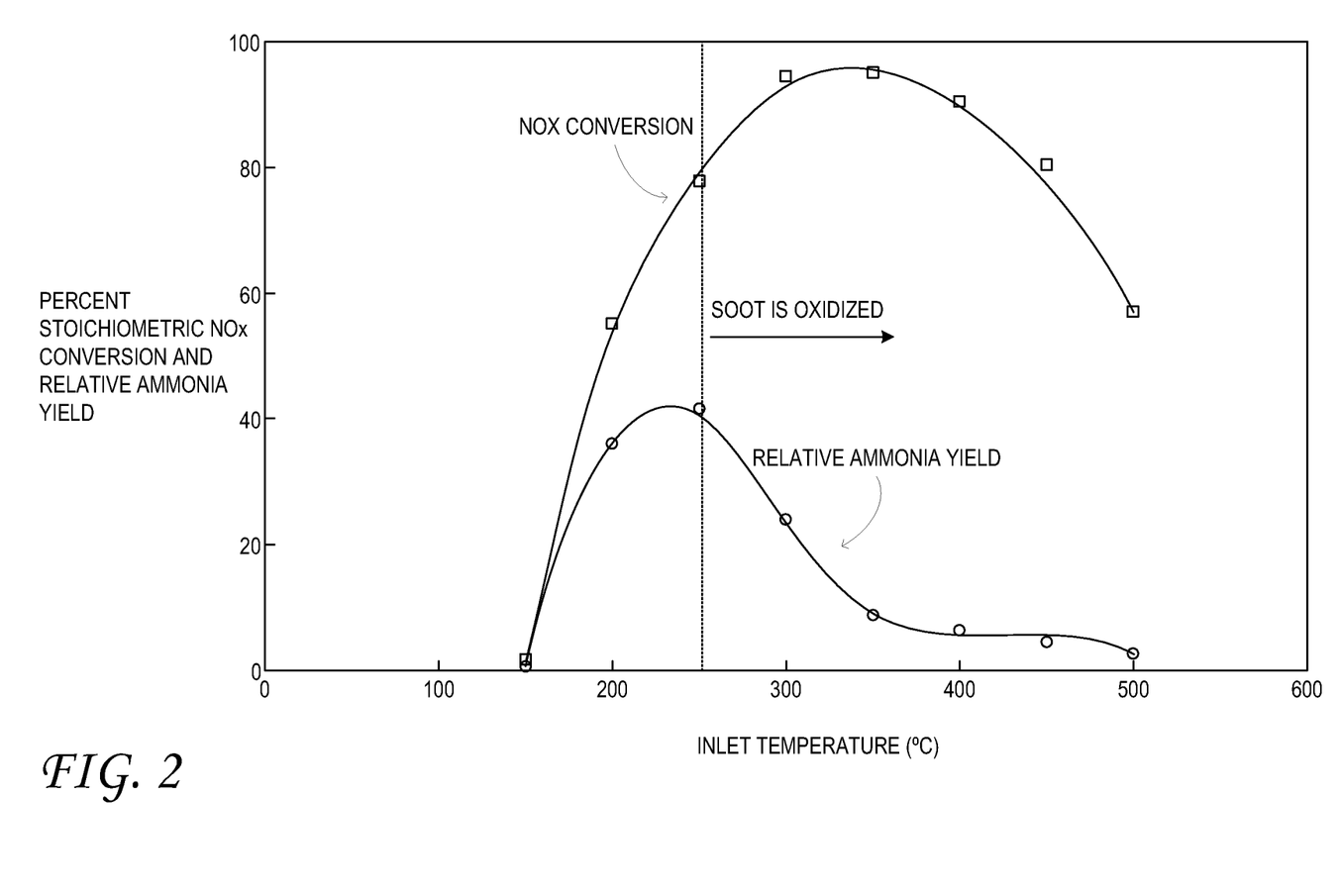
FIG. 2 is an example graph showing relative ammonia yield and overall NOx conversion for a redox-aged, flow-through exhaust-aftertreatment stage having an LNT catalyst in accordance with an embodiment of this disclosure.

FIG. 2 is an example graph showing relative ammonia yield and overall NOx conversion for a redox-aged, flow-through exhaust-aftertreatment stage having an LNT catalyst. These quantities are plotted versus exhaust inlet temperature under conditions where lean and rich exhaust are provided at a 25:5 duty cycle ratio (25 seconds lean, and 5 seconds rich), respectively, and where the rich air-to-fuel ratio is 0.89. The graph shows that overall NOx conversion peaks at about 325° C., while relative ammonia yield peaks at about 230° C. The relative ammonia yield is between 30 and 40 percent in when the temperature is between 175 and 275° C.

FIG. 2 also includes a dashed reference line at a temperature of approximately 250° C. Accordingly, a suitably configured DPF/LNT stage may rapidly oxidize accumulated soot in the region of the graph to the right of the reference line. More specifically, temperatures of 250° C. or greater may be sufficient for the DPF/LNT stage to oxidize soot at a rate that exceeds a nominal rate of accumulation of soot, such that continuous regeneration of the DPF/LNT stage is possible. Thus, careful examination of FIG. 2 reveals that it may be possible, under appropriate conditions, to oxidize soot on the LNT catalyst of the DPF/LNT stage while concurrently supplying ammonia to a downstream SCR stage. This is one potential advantage over systems where ammonia generation in an LNT stage is suspended during soot-filter regeneration.

The example configurations described above enable various methods for controlling emissions from an engine. Accordingly, some such methods are now described, by way of example, with continued reference to above configurations. It will be understood, however, that the methods here described, and others fully within the scope of this disclosure, may be enabled via other configurations as well. The methods presented herein include various measuring and/or sensing events enacted via one or more sensors disposed in the engine system. The methods also include various computation, comparison, and/or decision-making events, which may be enacted in an electronic control system operatively coupled to the sensors. The methods further include various hardware-actuating events, which the electronic control system may command in response to the decision-making events.

Figure 3:
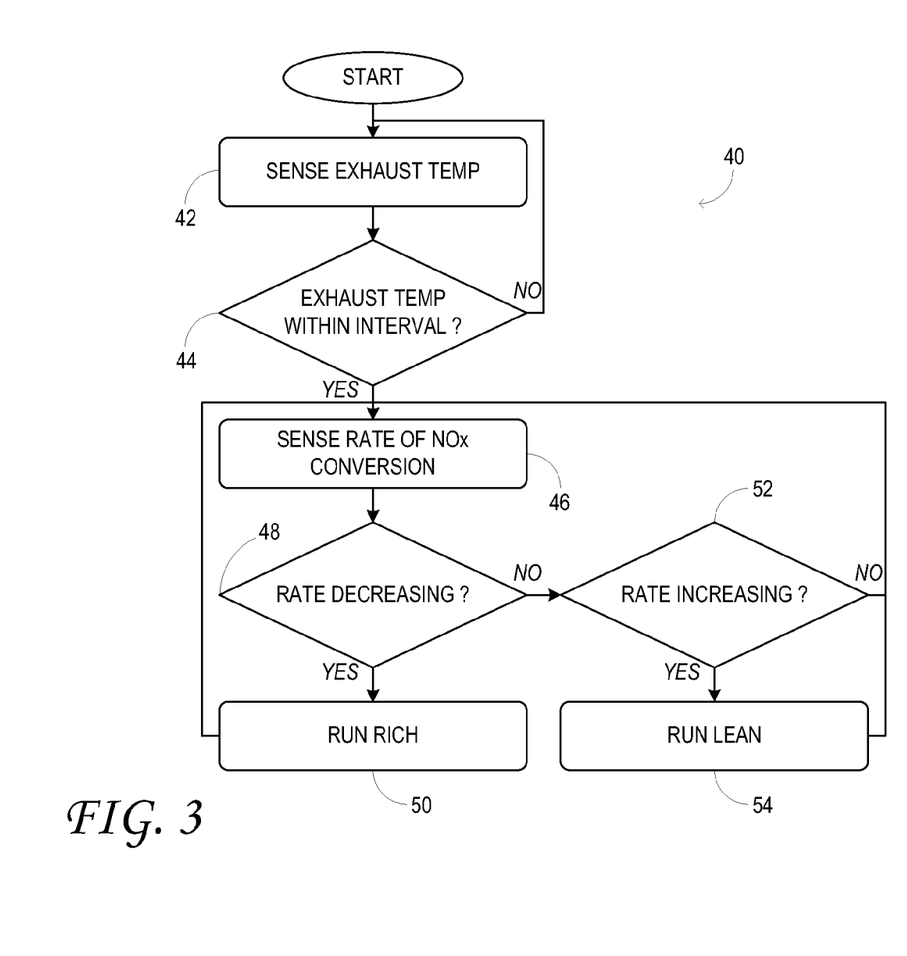
FIG. 3 illustrates an example method for controlling ammonia delivery to an SCR stage in accordance with an embodiment of this disclosure.

FIG. 3 illustrates an example method 40 for controlling ammonia delivery to an SCR stage downstream of a DPF/LNT stage in one embodiment. The method may be entered upon any time the engine is running.

Method 40 begins at 42, where an exhaust temperature of the engine is sensed. The exhaust temperature may be sensed via a temperature sensor, such as first temperature sensor 16 or second temperature sensor 26 in the configurations shown above. The method then advances to 44, where it is determined whether the exhaust temperature is within an interval suitable for further decision making, as outlined below. In one embodiment, the suitable interval may correspond to a normal operating range of the engine exhaust—between 150 and 450° C., for example. If the exhaust temperature is within the interval, then the method advances to 46, where a rate of NOx conversion is sensed. The particular rate of NOx conversion sensed may differ in the various embodiments of this disclosure. In one embodiment, the rate of NOx conversion may be a rate of conversion in an SCR stage disposed downstream of a DPF/LNT stage in the engine system. Accordingly, with reference to engine system 10, the rate of NOx conversion may be determined by interrogating first NOx sensor 22 and second NOx sensor 30. In one embodiment, the rate may be determined as the absolute difference between the two sensor responses. In another embodiment, the rate may be determined as a relative difference between the two sensor responses—e.g., the difference divided by the average of the two sensor responses—corresponding to an efficiency of NOx reduction over the LNT catalyst. In such embodiments, as further described below, the air-to-fuel ratio of the exhaust flowing over the LNT catalyst may be increased when an efficiency of nitrogen-oxide reduction over the SCR catalyst increases and decreased when the efficiency of nitrogen-oxide reduction over the SCR catalyst decreases.

Method 40 then advances to 48, where it is determined whether the rate of NOx conversion is decreasing. In one embodiment, such determination may involve comparing the rate of change of the rate of NOx conversion to a threshold value. If it is determined, at 48, that the rate of NOx conversion is decreasing, then the method advances to 50, where the engine is run at a rich air-to-fuel ratio. With reference to engine system 10, running the engine at a rich air-to-fuel ratio supplies rich exhaust to DPF/LNT stage 20 and the LNT catalyst therein, which results in reduction of NOx trapped therein. The reduction of NOx yields ammonia, which flows to SCR stage 28, downstream of the DPF/LNT stage. Under these conditions, soot accumulated on the LNT catalyst of the DPF/LNT stage may concurrently be oxidized.

However, if it is determined, at 48, that the rate of NOx conversion is not decreasing, then method 40 advances to 52, where it is determined whether the rate of NOx conversion is increasing. In one embodiment, such determination may involve comparing the rate of change of the rate of NOx conversion to a threshold value. If it is determined, at 52, that the rate of NOx conversion is increasing, then the method advances to 54, where the engine is run at a lean (e.g., normal) air-to-fuel ratio. Under lean conditions as well as rich conditions, soot accumulated on the LNT catalyst of the DPF/LNT stage may be oxidized. If, however, it is determined at 52 that the rate of NOx conversion is neither increasing nor decreasing within appropriate limits, then the method loops back to 46, where the rate of NOx conversion is again sensed. The method also returns to this point from 50 and 54, after rich or lean operation is enacted. In this manner, method 40 maintains the amount of ammonia stored in the SCR stage at a suitable level for efficient reduction of NOx therein.

In the embodiment illustrated in FIG. 3, the amount of ammonia supplied to the SCR stage is determined indirectly, by sensing a rate or efficiency of NOx conversion therein. In other embodiments, the amount of ammonia supplied to the SCR stage may be determined by interrogating an ammonia sensor—e.g., ammonia sensor 24 in engine system 10. In such embodiments, the engine may be run richer when the response of the ammonia sensor falls below a threshold value and restored to lean operation when the level of ammonia rises above a threshold value. In still other embodiments, the particular air-to-fuel ratio used during rich periods may be varied in response to the rate or efficiency of NOx conversion in the SCR stage. In these and other embodiments, suitable constraints may be placed on the period of time during which the engine may be run rich, and on the interval between successive rich periods. In one embodiment, for instance, lean engine operation may be restored after 1 to 3 minutes of rich operation irrespective of NOx sensor response. In another embodiment, rich operation may enabled only 10 or more minutes after a previous rich operation has ended. Naturally, it will be understood that the numerical ranges and values given here are examples only, for numerous other values and ranges are contemplated as well. In still other embodiments, the rich and/or lean operation may be terminated in response to air-fuel ratio sensor data downstream of the NOx trap.

Figure 4:
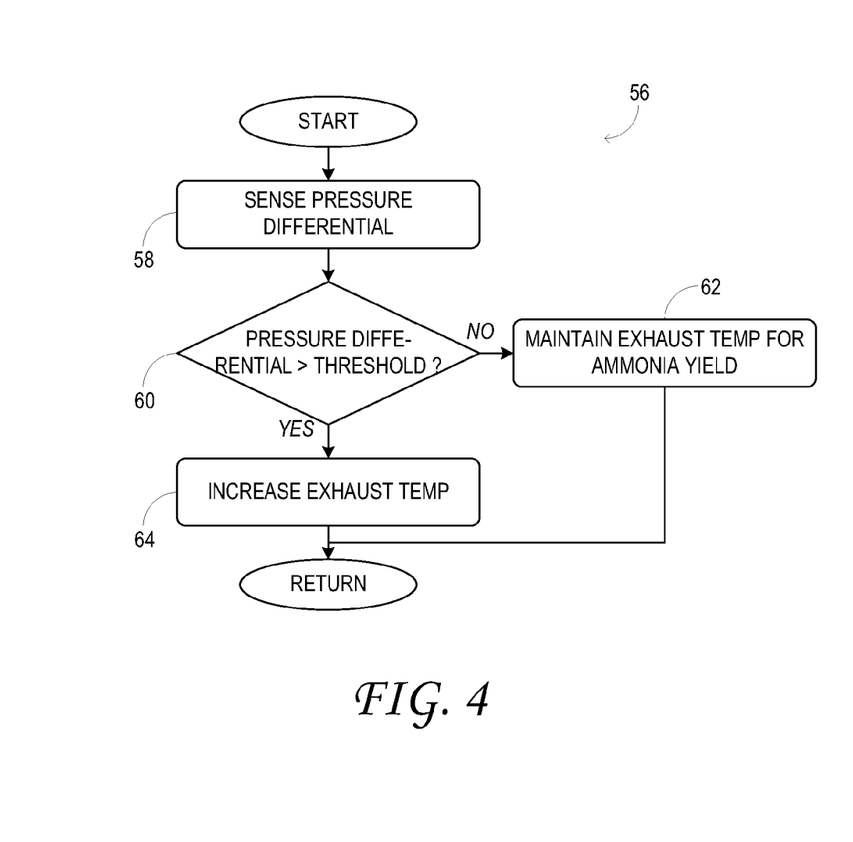
FIG. 4 illustrates an example method for controlling regeneration of a DPF/LNT stage in accordance with an embodiment of this disclosure.

FIG. 4 illustrates an example method 56 for controlling regeneration of a DPF/LNT stage. The method may be entered upon any time the engine is running.

Method 56 begins at 58, where a pressure differential across the DPF/LNT stage (i.e., the locus of the LNT catalyst) is sensed. The pressure differential may be sensed directly, via one or more pressure sensors coupled in the engine system, or indirectly in any suitable manner. The method then advances to 50, where the pressure differential is compared to a threshold. If it is determined that the pressure differential does not exceed the threshold, then the method advances to 62, where the exhaust temperature is maintained within a suitable range of temperatures for efficient yield of ammonia from the LNT catalyst; in one embodiment, the temperature may be maintained between 175 and 275° C. At such temperatures, a relative yield of nitrogen-oxide conversion to ammonia on the LNT catalyst may be 30 percent or greater. However, if it is determined that the pressure differential does exceed the threshold, then the exhaust temperature is increased to a temperature that will allow rapid oxidation of soot collected on the LNT catalyst. Inasmuch as soot accumulation on the LNT catalyst is correlated to the pressure differential across the DPF/LNT stage, exhaust temperature may be increased during a condition of increased soot accumulation on the LNT catalyst and decreased during a condition of decreased soot accumulation. In one embodiment, the exhaust temperature may be increased to 250° C. or above to promote oxidation of soot on the LNT catalyst. Thus, the temperature may be increased to temperatures at which a relative yield of nitrogen-oxides conversion to ammonia on the LNT catalyst is still 20 percent or greater (as shown in FIG. 2). During such increased-temperature operation, the engine may be run stoichiometric, lean, or rich. Following steps 62 or 64, method 56 returns.

Figure 5:
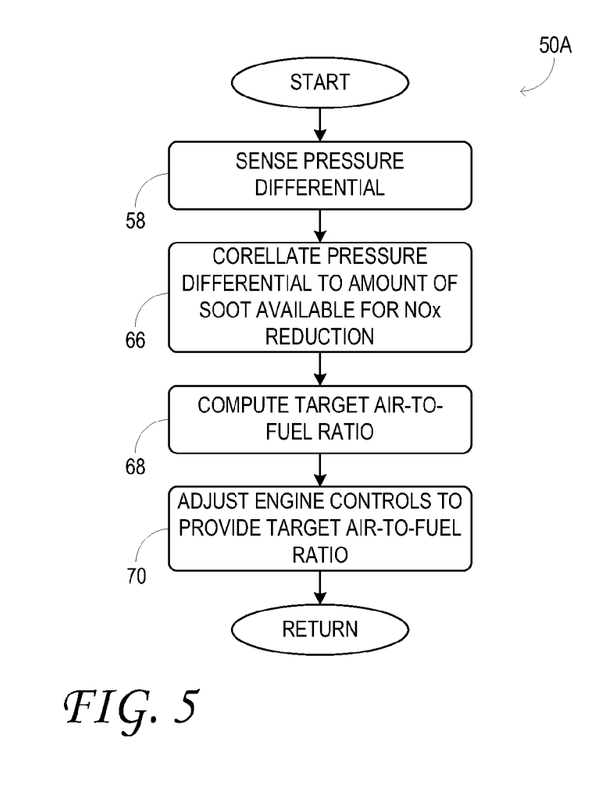
FIG. 5 illustrates an example method for running an engine at a rich air-to-fuel ratio in accordance with an embodiment of this disclosure.

As noted above, FIG. 3 illustrates an example method for controlling ammonia delivery to an SCR stage, and FIG. 4 illustrates an example method for controlling regeneration of a DPF/LNT stage. These methods may be enacted independently of each other. Accordingly, it is possible under appropriate conditions to oxidize soot on the LNT catalyst of the DPF/LNT stage while concurrently supplying ammonia to the downstream SCR stage. In one embodiment, ammonia delivery may be ideally uncoupled from soot filter regeneration. However, various modes of interoperability between ammonia delivery and soot filter regeneration are contemplated as well. One such method is illustrated in FIG. 5. This method is based on the inference that soot accumulated in the DPF/LNT stage can act as a reductant for stored oxidizing equivalents (NOx and oxygen) in the LNT catalyst therein. Accordingly, the soot accumulated in the DPF/LNT stage will decrease the amount of rich exhaust gas (hydrogen, hydrocarbons, carbon monoxide, etc.) needed to reduce such stored oxidizing equivalents, to convert a given amount of NOx, and to generate a given amount of ammonia.

FIG. 5 illustrates an example method 50A for running the engine at a rich air-to-fuel ratio in one embodiment. Method 50A may be executed as a component method in a method for controlling ammonia delivery to an SCR stage. For example, method 50A may be a more particular instance of the actions represented by block 50 of method 40.

Method 50A begins at 58, where the pressure differential across the DPF/LNT stage is sensed substantially as described above. The method then advances to 66, where the pressure differential is correlated to an amount of accumulated soot available for oxidation in the DPF/LNT stage. The pressure differential and the amount of soot available may be correlated by accessing a look-up table stored in a memory of an electronic control system or in any other suitable manner. Accordingly, at least one of an air-to-fuel ratio of the rich exhaust and a duration of flowing the rich exhaust over the LNT catalyst may be adjusted in response to the pressure differential across the DPF/LNT stage or other locus of the LNT catalyst.

Method 50A then advances to 68, where a target air-to-fuel ratio is computed based at least partly on the amount of accumulated soot available for oxidation. In particular, the target air-to-fuel ratio may increase as the amount of accumulated soot available for oxidation decreases, and, the target air-to-fuel ratio may decrease as the amount of accumulated soot available for oxidation increases. In another embodiment, the target air-to-fuel ratio may be adjusted based on the amount of soot actually being oxidized—as determined via suitable exhaust system sensors (e.g., a temperature sensor or carbon dioxide sensor configured to respond to a rate of soot oxidation) or in another suitable manner. In particular, the target air-to-fuel ratio may increase as the amount of soot being oxidized decreases, and, the target air-to-fuel ratio may decrease as the amount of soot being oxidized increases. The method then advances to 70, where appropriate engine controls (throttle valve opening amount, fuel injection amount, EGR amount, etc.) are adjusted to provide the target air-to-fuel ratio.

In this manner, the air-to-fuel ratio provided to the engine is corrected to account for the amount of reductant supplied to the LNT catalyst in the form of trapped soot. This control feature allows for the engine to run less rich even when rich conditions are needed for reduction of trapped NOx. An engine system configured in this way may provide better fuel economy. Further, there is true synergy in this approach as an engine running less rich during rich conditions will generally produce less soot, leading to more efficacious continuous regeneration and requiring less frequent forced regeneration.

Although method 50A specifically illustrates that the depth of the rich condition may be altered in response to an amount of soot accumulated on the LNT catalyst, other, related strategies are contemplated as well. In another embodiment, for example, the depth of the rich condition may remain the same regardless of the amount of trapped accumulated soot available for oxidation, but the duration of the rich period (e.g., the period during which the exhaust flows at a rich air-to-fuel ratio) may be changed. Accordingly, the rich period may be shortened relative to a no-soot-accumulation baseline value in proportion to the amount of accumulated soot available for oxidation. In other words, the duration of flowing rich exhaust over the LNT catalyst may be shortened when the amount of soot increases and lengthened when the amount of soot decreases. In still other embodiments, both the depth and the duration of the rich period may be reduced in proportion to the amount of accumulated soot available for oxidation.

Figure 6:
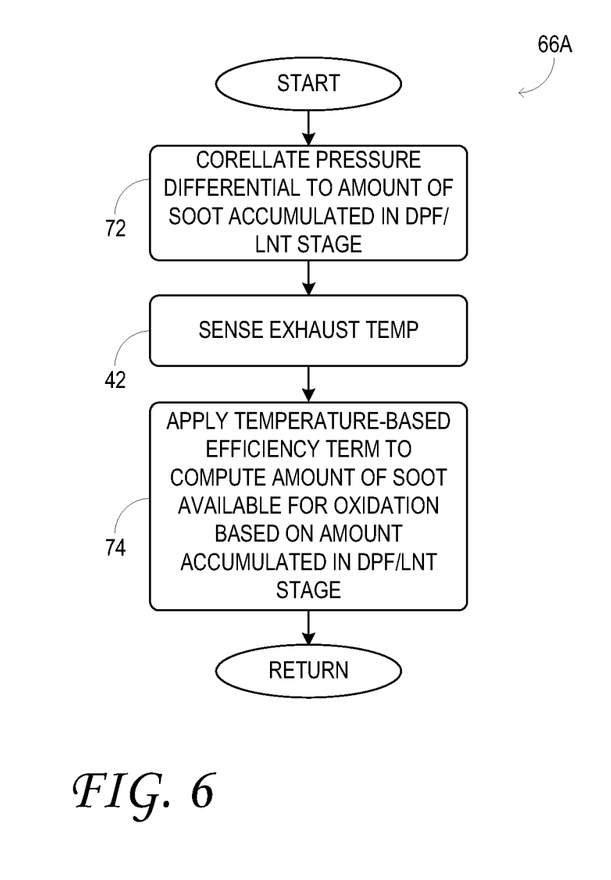
FIG. 6 illustrates an example method for correlating a pressure differential across a DPF/LNT stage to an amount of accumulated soot available for oxidation therein, in accordance with an embodiment of this disclosure.

FIG. 6 illustrates an example method 66A for correlating a pressure differential across a DPF/LNT stage to an amount of accumulated soot available for oxidation therein. Method 66A may be executed as a component method in a method for running an engine at a rich air-to fuel ratio. For example, method 66A may be a more particular instance of step 66 in method 50A. Method 66A is based on the inference that increasing the temperature of the LNT catalyst increases the rate of oxidation of soot accumulated thereon, which therefore increases the amount of soot available for oxidation in the DPF/LNT stage over a given period of time. By invoking method 66A, the amount by which the air-to-fuel ratio of the rich exhaust and/or the duration of flowing the rich exhaust may be adjusted based on exhaust temperature. For example, the amount may be increased with increasing exhaust temperature and decreased with decreasing exhaust temperature.

Method 66A begins at 58, where a pressure differential across the DPF/LNT stage is correlated to an amount of soot accumulated in the DPF/LNT stage. The method then advances to 42, where the exhaust temperature is sensed, substantially as described above. The method then advances to 74, where a temperature-based efficiency term is applied in order to compute the amount of soot available for oxidation based on the amount of soot accumulated. In one embodiment, the efficiency term may increase from a value of zero at 200° C. to a substantial value (e.g., 0.5) at 250° C., and then asymptotically approach unity at temperatures greater than 250° C. Naturally, the numerical values and ranges provided herein will be understood as examples only, for other values and ranges are contemplated as well.

It will be understood that the example control and estimation routines disclosed herein may be used with various system configurations. These routines may represent one or more different processing strategies such as event-driven, interrupt-driven, multi-tasking, multi-threading, and the like. As such, the disclosed process steps (operations, functions, and/or acts) may represent code to be programmed into computer readable storage medium in an electronic control system.

It will be understood that some of the process steps described and/or illustrated herein may in some embodiments be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used.

Finally, it will be understood that the articles, systems and methods described herein are exemplary in nature, and that these specific embodiments or examples are not to be considered in a limiting sense, because numerous variations are contemplated. Accordingly, this disclosure includes all novel and non-obvious combinations and sub-combinations of the various systems and methods disclosed herein, as well as any and all equivalents thereof.

The invention claimed is:

1. A method for controlling emissions from an engine, comprising:
   reducing trapped nitrogen oxides to ammonia on a lean nitrogen-oxide trapping (LNT) catalyst while concurrently oxidizing soot accumulated on the LNT catalyst including flowing exhaust from the engine over the LNT catalyst;
   flowing the ammonia to a selective catalytic reduction (SCR) catalyst; and
   adjusting a duration of flowing the exhaust over the LNT catalyst in response to an amount of soot oxidized on the LNT catalyst.

2. The method of claim 1, wherein the duration of flowing the exhaust over the LNT catalyst is adjusted in response to a pressure differential across a locus of the LNT catalyst.

3. The method of claim 1, wherein the SCR catalyst is arranged on an internal cell structure of a soot filter.

4. The method of claim 1, wherein an amount by which the duration of flowing the exhaust over the LNT catalyst is adjusted is based on exhaust temperature, and wherein said amount is increased with increasing exhaust temperature and decreased with decreasing exhaust temperature.

5. The method of claim 4, further comprising increasing the exhaust temperature during a condition of increased soot accumulation on the LNT catalyst and decreasing the exhaust temperature during a condition of decreased soot accumulation on the LNT catalyst.

6. The method of claim 5, wherein increasing the exhaust temperature comprises increasing to a temperature where a relative yield of nitrogen-oxide conversion to ammonia on the LNT catalyst is 20 percent or greater.

7. The method of claim 5, further comprising flowing rich exhaust to the LNT catalyst.

8. The method of claim 5, wherein decreasing the exhaust temperature comprises decreasing to a temperature where a relative yield of nitrogen-oxide conversion to ammonia on the LNT catalyst is 30 percent or greater.

9. A method for controlling emissions from an engine, comprising:
   reducing trapped nitrogen oxides to ammonia on a lean nitrogen-oxide trapping (LNT) catalyst while concurrently oxidizing soot accumulated on the LNT catalyst including flowing exhaust from the engine over the LNT catalyst,;
   flowing the ammonia to a selective catalytic reduction (SCR) catalyst; and
   adjusting a duration of flowing the exhaust over the LNT catalyst in response to an amount of soot oxidized on the LNT catalyst;
   increasing an air-to-fuel ratio of the exhaust when the amount of soot increases and decreasing the air-to-fuel ratio of the exhaust when the amount of soot decreases, wherein increasing and decreasing the air-to-fuel ratio of the exhaust comprises adjusting at least one of a fuel-injection amount and a throttle valve opening amount of the engine, wherein an amount by which the at least one of an air-to-fuel ratio of the exhaust and a duration of flowing the exhaust over the LNT catalyst is adjusted is based on exhaust temperature, and wherein said amount is increased with increasing exhaust temperature and decreased with decreasing exhaust temperature.

10. A method for controlling emissions from an engine, comprising:
    reducing trapped nitrogen oxides to ammonia on a lean nitrogen-oxide trapping (LNT) catalyst while concurrently oxidizing soot accumulated on the LNT catalyst including flowing exhaust from the engine over the LNT catalyst;
    flowing the ammonia to a selective catalytic reduction (SCR) catalyst; and
    adjusting an air-to-fuel ratio of the exhaust in response to an accumulated soot amount on the LNT catalyst and a pressure differential across a locus of the LNT catalyst.

11. The method of claim 10, further comprising increasing an exhaust temperature during a condition of increased soot accumulation on the LNT catalyst and decreasing the exhaust temperature during a condition of decreased soot accumulation on the LNT catalyst.

12. The method of claim 11, further comprising flowing rich exhaust to the LNT catalyst.

* * * * *